United States Patent [19]
Hirohata

[11] Patent Number: 5,864,719
[45] Date of Patent: *Jan. 26, 1999

[54] OPTICAL APPARATUS

[75] Inventor: Michio Hirohata, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 777,420

[22] Filed: Dec. 30, 1996

[30] Foreign Application Priority Data

Jan. 8, 1996 [JP] Japan .................................. 8-000904

[51] Int. Cl.⁶ .............................. G03B 3/00; G03B 13/10; G03B 17/00
[52] U.S. Cl. ................................ 396/82; 396/84; 396/90; 396/379
[58] Field of Search ................................ 396/79, 82, 84, 396/83, 379, 378, 90

[56] References Cited

U.S. PATENT DOCUMENTS

| | | | |
|---|---|---|---|
| 5,036,346 | 7/1991 | Hatamori et al. | 396/84 |
| 5,111,227 | 5/1992 | Ogawa | 396/84 |
| 5,223,873 | 6/1993 | Tsuboi | 396/82 |

FOREIGN PATENT DOCUMENTS

| | | |
|---|---|---|
| 0671643 | 9/1995 | European Pat. Off. . |
| 4119541 | 12/1991 | Germany . |

OTHER PUBLICATIONS

Patent abstracts of Japan No. JP 02 024613 A, published Mar. 30, 1990.

Primary Examiner—W. B. Perkey
Attorney, Agent, or Firm—Robin, Blecker & Daley

[57] ABSTRACT

An optical apparatus comprises an association device which operates a viewfinder in association with a movement of an image forming optical system. After the movement of the image forming optical system, the association device severs the association of the viewfinder with respect to a movement of the image forming optical system in a direction different from that of the first-mentioned movement.

165 Claims, 5 Drawing Sheets

OPTICAL APPARATUS

BACKGROUND OF THE INVENTION

1. Field of the Invention

This invention relates to an optical apparatus such as a camera or the like and, more particularly, to an optical apparatus having an image forming optical system arranged to be capable of carrying out a magnification varying action and a focus adjusting action and a viewfinder arranged to display images at a magnifying rate which varies according to the magnification varying state of the image forming optical system.

2. Description of Related Art

In the field of the lens-shutter type cameras which are arranged to have viewfinder optical systems separately from photographing optical systems, it has recently become popular to arrange them to be equipped with zoom lens barrels. The cameras arranged in this manner are called zoom cameras in general. Each of such zoom cameras is arranged to cause the viewfinder optical system to vary its magnification in association with the magnification varying action of the photographing optical system.

Generally, the lens-shutter type cameras are desired, as a designing target, to be small in size, light in weight and low in manufacturing cost. To attain the designing target, for example, the following contrivances have been proposed.

(a) Japanese Laid-Open Patent Application No. HEI 5-173223.

A viewfinder optical system is arranged to be moved by a lever which moves following the magnification varying action of a lens barrel of a photographing optical system.

(b) Japanese Laid-Open Patent Application No. HEI 2-24613.

One and the same motor is arranged to be used for both focusing and zooming actions.

(c) Japanese Laid-Open Patent Application No. SHO 64-84233.

One and the same motor is arranged to be used for focusing and zooming actions through a helical bar.

(d) Japanese Laid-Open Patent Application No. SHO 61-259237.

A single cam groove in a zigzag shape is formed in a cam plate by connecting one end of each of a plurality of focusing cam grooves and a plurality of zooming cam grooves extending in respective different directions to one end of another. One and the same cam plate formed in this manner is arranged to be used for focusing and zooming actions which are alternately performed by a photographing optical system.

(e) Meanwhile, a camera has been commercialized, in which a viewfinder optical system is moved through a cam in association with a photographing optical system which alternately performs focusing and zooming actions according to a cam plate similar to the above-stated cam plate disclosed in Japanese Laid-Open Patent Application No. SHO 61-259237. The action of the cam makes the viewfinder optical system stationary when the photographing optical system is performing the focusing action, and causes the viewfinder optical system to perform its magnification varying action in association with the photographing optical system when the photographing optical system performs its magnification varying action.

In the case of the camera mentioned in Paragraph (e) above, a cam follower of the photographing optical system moves alternately in a magnification varying area and a focus adjusting area of the cam, for example, when the position of the photographing optical system is moving from a telephoto end position toward a wide-angle end position. Accordingly, the size of an image obtained in the viewfinder continuously varies in the magnification varying area of the cam but does not vary in the focus adjusting area of the cam. Therefore, the image magnifying rate in the viewfinder comes to intermittently change. The intermittent change has presented a problem because it gives an unnatural, unpleasant impression to the operator of the camera who looks into the viewfinder.

BRIEF SUMMARY OF THE INVENTION

It is one aspect of this invention to provide an optical apparatus comprising an association device which operates a viewfinder in association with a movement of an image forming optical system, wherein the association device, after the movement of the image forming optical system, severs the association of the viewfinder with respect to a movement of the image forming optical system in a direction different from that of the first-mentioned movement, so that the operator who looks into the viewfinder is prevented from being given an unnatural or unpleasant impression with respect to the action of the image forming optical system.

The above and other aspects and features of this invention will become apparent from the following detailed description of embodiments thereof taken in conjunction with the accompanying drawings.

BRIEF DESCRIPTION OF THE SEVERAL VIEWS OF THE DRAWING

In FIG. 2, a part (a) shows a case where the position of the image forming optical system is shifting to a wide-angle position, a part (b) shows a case where the position of the image forming optical system is shifting to a middle position, and a part (c) shows a case where the position of the image forming optical system is shifting to a telephoto position.

DETAILED DESCRIPTION OF THE INVENTION

Preferred embodiments of this invention are described in detail below with reference to drawings. Although optical apparatuses according to the embodiments to be described in the following are zoom cameras, the optical apparatuses to which this invention is applicable are not limited to zoom cameras.

Figure 1:
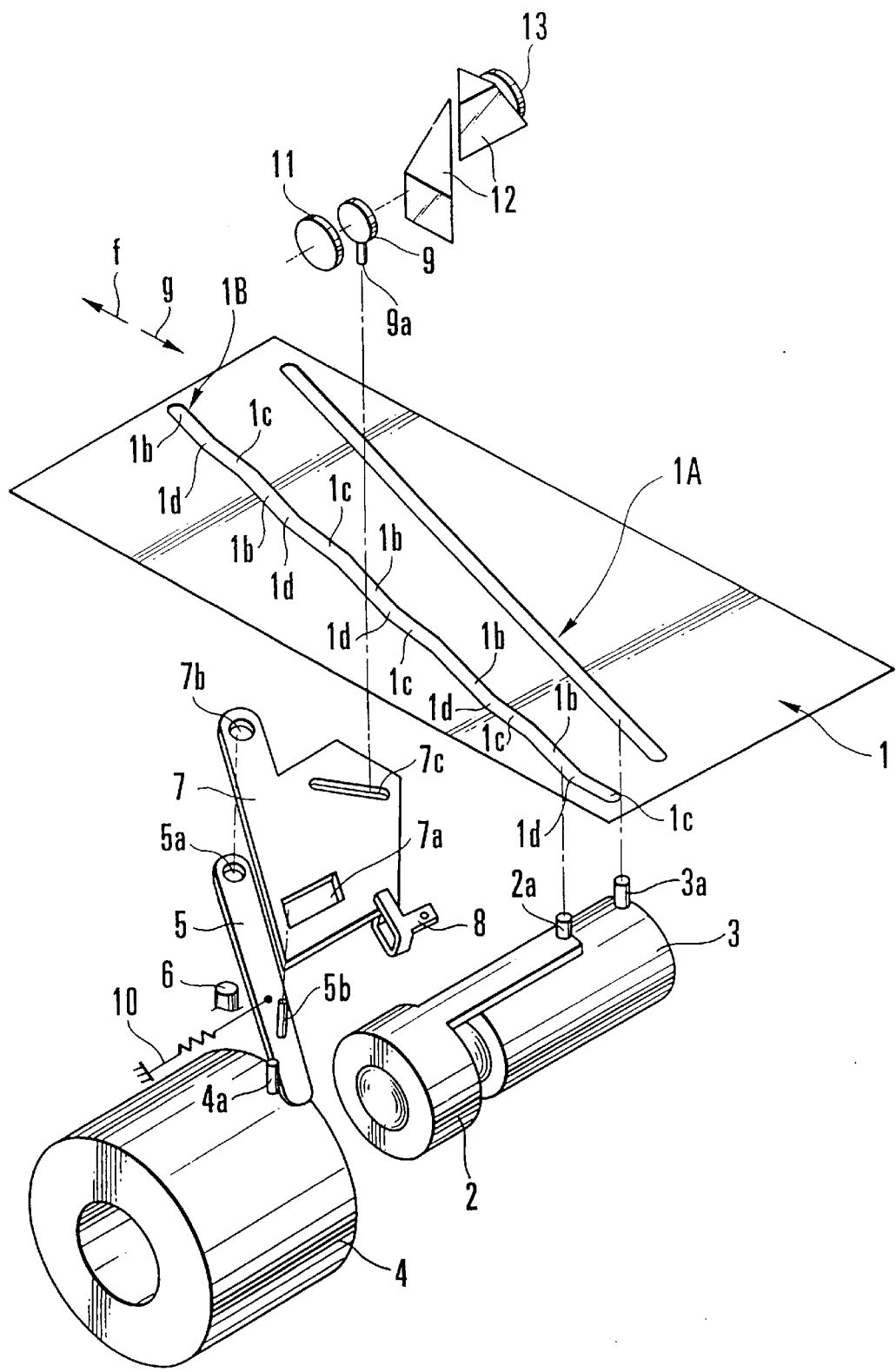
FIG. 1 is an exploded perspective view showing in part the mechanical structure of an optical apparatus arranged as a first embodiment of this invention.

FIG. 1 shows a first embodiment of this invention. Referring to FIG. 1, a first lens group holding tube 2 is arranged to hold a first lens group of a photographing optical system of the camera and to be movable only in the direction of an optical axis. A second lens group holding tube 3 is arranged to hold a second lens group of the photographing optical system of the camera and to be movable only in the direction of the optical axis. A lens barrel 4 is arranged to move integrally with the second lens group holding tube 3. A cam plate 1 has cam grooves 1A and 1B formed therein and is arranged to be moved in the direction of an arrow "f" or "g" by a mechanism which is not shown. A follower pin 2a is fixed to the first lens group holding tube 2 and is inserted into the cam groove 1B in such a way as to be slidable relative to the cam groove 1B. Another follower pin 3a is fixed to the second lens group holding tube 3 and is inserted into the cam groove 1A in such a way as to be slidable relative to the cam groove 1A. An interlocking pin 4a is arranged to protrude from the lens barrel 4 and to engage a first lever 5 of an association means which will be described later. The first lever 5 is provided with a hole 5a formed at its one end. The first lever 5 is thus arranged to be turned, at the hole 5a, on a fixed pin 6 which protrudes from a structural member (not shown) of the camera. A second lever 7 is arranged to be turned on the same pin 6 at a hole 7b formed in the second lever 7. A pinching spring member 8 is arranged to lightly pinch the upper and lower surfaces of the second lever 7 in such a way as to apply to the second lever 7 a braking force for suppressing any unnecessary movement. A magnification varying lens holding frame 9 is arranged to hold a magnification varying lens, i.e., a variator lens, of a viewfinder optical system. A follower pin 9a is arranged to protrude from the magnification varying lens holding frame 9 and is inserted into a third cam groove 7c provided in the second lever 7. A spring 10 is arranged to push the fore end of the first lever 5 against the pin 4a of the lens barrel 4. The viewfinder optical system includes, in addition to the magnification varying lens holding frame 9, an objective lens 11, an image inverting prism 12 and an eyepiece 13. The cam groove 1A provided in the cam plate 1 is for positioning the second lens group holding tube 3 in the direction of the optical axis, and, as shown in FIG. 1, is a straight groove extending at some angle relative to the moving direction of the cam plate 1 (a direction perpendicular to the optical axis of the camera). On the other hand, the cam groove 1B provided in the cam plate 1 is for positioning the first lens group holding tube 2 in the direction of the optical axis, and, as shown in FIG. 1, is configured in a zigzag shape by alternately arranging in series short straight groove parts 1b, each of which extends in a first direction (a direction parallel to the cam groove 1A), and short straight groove parts 1c, each of which extends in a second direction (a direction perpendicular to the optical axis). The groove parts 1b serve as a focusing control cam for causing the photographing optical system to make focus adjustment. The groove parts 1c serve as a zooming control cam for causing the photographing optical system to perform a magnification varying action.

Further, the position 1d of one end of each of the groove parts 1b corresponds to a focus adjustment standby position (focus adjusting action starting position) of the follower pin 2a of the first lens group holding tube 2 in each of the groove parts 1b.

In the arrangement described above, when the cam plate 1 is moved in the direction of the arrow f while the follower pin 2a of the first lens group holding tube 2 is located in one of the groove parts 1b, the first lens group holding tube 2 and the second lens group holding tube 3 are drawn forward by the same amount in the direction of the optical axis. An action performed in this manner is called an all-group-drawing-out focusing action.

On the other hand, when the cam plate 1 is moved in the direction of the arrow f while the follower pin 2a is located in one of the groove parts 1c, the first lens group holding tube 2 is not moved in the direction of the optical axis and the position of the second lens group holding tube 3 alone in the direction of the optical axis comes to vary. As a result, a distance between the first lens group and the second lens group varies to bring about a zooming effect on the photographing optical system.

The first lever 5 and the second lever 7 jointly form an association means for causing the viewfinder optical system to perform a magnification varying action in association with a magnification varying action of the photographing optical system. The association means is provided also with a dissociation means for causing the first lever 5 and the second lever 7 not to associate with each other.

In the case of this embodiment, the dissociation means is composed of a pin 5b protruding from the first lever 5 and a rectangular slot (or a rectangular recess) 7a formed in the second lever 7. The length of the major side of the slot 7a is so determined as to bring about the following movement between the first lever 5 and the second lever 7.

Figure 2:
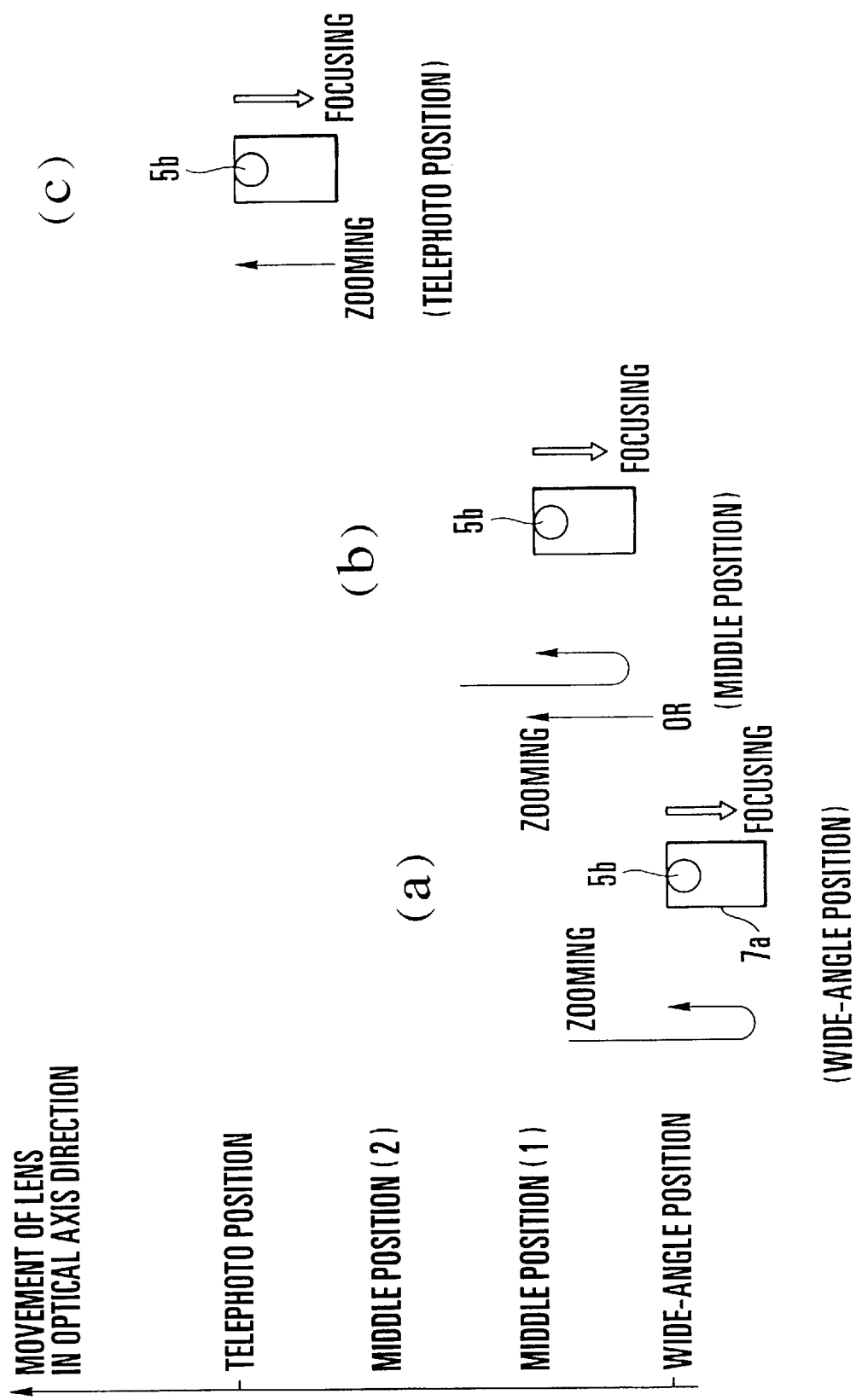
FIG. 2 is a diagram for explaining a positional relationship between a pin 5b of a lever 5 which is interlocked with an image forming optical system (photographing optical system) of the optical apparatus and a slot 7a provided in a second lever 7 shown in FIG. 1.

FIG. 2 is a diagram for explaining a positional relationship between the pin 5b of the first lever 5 and the rectangular slot 7a of the second lever 7 obtained when the photographing optical system performs its magnification varying action and its focus adjusting action.

In the case of this embodiment, the focus adjusting action of the photographing optical system is performed by always shifting the position of the photographing optical system in such a direction to draw the photographing optical system inward (or downward as viewed in FIG. 2) from the focus adjustment standby position 1d corresponding to the desired rate of magnification.

At a part (a) on the left side in FIG. 2, a thick arrow indicates the focusing action of the photographing optical system and a thin arrow indicates the movement of the pin 5b taking place in shifting the position of the photographing optical system toward a shorter focal length position (toward a wide-angle position) for varying the magnification of the photographing optical system.

In varying the magnification position of the photographing optical system by shifting the photographing optical system toward the wide-angle position, the cam plate 1 shown in FIG. 1 moves in the direction of the arrow "g", i.e., in such a direction as to draw the photographing optical system inward. The first lens group holding tube 2 then moves rearward along the optical axis when the follower pin 2a is located within a section defined by the cam groove part 1b but does not move when the follower pin 2a is located within a section defined by the cam groove part 1c which is rectangular to the optical axis.

Meanwhile, since the follower pin 3a of the second lens group holding tube 3 is inserted in the cam groove A, the second lens group holding tube 3 moves always in the lens-drawing-in direction, i.e., rearward (to the right as viewed in FIG. 1). The lens barrel 4 which is integral with the second lens group holding tube 3 also moves in the lens-drawing-in direction. The pin 4a of the lens barrel 4 and the pin 5b of the first lever 5, therefore, also move continuously rearward.

Referring to the part (a) of FIG. 2, when the photographing optical system begins to perform its magnification varying action while moving toward the wide-angle position, the pin 5b of the first lever 5 moves from a fore end position of the slot 7a toward a rear end position of the slot 7a. The second lever 7 is not driven by the pin 5b of the first lever 5 during a very short period until the pin 5b comes to abut on the rear end edge of the slot 7a. During this very short period, the magnification varying lens holding frame 9 of the viewfinder optical system does not move, thereby causing no magnification varying action in the viewfinder optical system.

After the pin 5b abuts on the rear end edge of the slot 7a, the pin 5b continues to push rearward the rear end edge of the slot 7a until the pin 5b reaches a position corresponding to the wide-angle position. The second lever 7 is then turned counterclockwise, as viewed in FIG. 1, on the hole 7b as much as an angular extent corresponding to the amount of pushing during such a period. As a result, the magnification varying lens holding frame 9 of the viewfinder optical system is moved in the direction of the optical axis to cause the magnification of the viewfinder optical system to continuously vary toward a wide-angle side according to variations taking place in the magnification of the photographing optical system. After that, when the follower pin 2a of the first lens group holding tube 2 comes to the wide-angle position of the cam groove 1B and then further moves as much as the amount of focus adjustment to come near the end position of the cam groove 1B, the moving direction of the cam plate 1 is reversed to cause the second lens group holding tube 3 and the lens barrel 4 to be drawn out toward a telephoto side. At that time, since the light braking force of the pinching spring member 8 applied to the second lever 7 keeps the second lever 7 unmovable, the pin 5b of the first lever 5 moves away from the rear end edge of the rectangular slot 7a and comes near the front end edge of the slot 7a. When the pin 5b comes near the front end edge of the slot 7a, the follower pin 2a reaches the focus adjustment standby position id of the groove part 1b of the cam plate 1. At the same time, the cam plate 1 ceases to move, and the action of setting the magnification at the wide-angle position comes to an end.

When a focusing action is taken at the wide-angle position after the magnification setting action, the cam plate 1 again comes to move in the direction of the thick arrow shown in FIG. 2. In this instance, however, the pin 5b of the first lever 5 never pushes the rear end edge of the slot 7a of the second lever 7 since the pin 5b moves rearward only within the internal range of the slot 7a. Therefore, the second lever 7 is not turned while the first lever 5 is turned. Accordingly, no magnification varying action of the viewfinder optical system occurs during the focusing action of the photographing optical system.

Another part (b) in FIG. 2 shows the movement of the pin 5b of the first lever 5 taking place in shifting the position of the photographing optical system for varying its magnification position to middle focal length positions (1) and (2).

In shifting the position of the photographing optical system from a wide-angle side to a middle position (middle focal length position), the pin 5b of the first lever 5 pushes the fore end edge of the rectangular slot 7a of the second lever 7, as shown by a thin arrow, to turn the second lever 7, thereby continuously varying the image magnification of the viewfinder optical system. The follower pin 2a of the first lens group holding tube 2 then moves to the focus adjustment standby position 1d of the groove part 1b of the cam plate 1 and comes to a stop there.

After that, in performing the focusing action at this middle position, the pin 5b of the first lever 5 moves rearward only within the internal range of the slot 7a, in the same manner as in the above-stated case of focusing at the wide-angle position, so that the second lever 7 does not move. Therefore, no magnification varying action of the viewfinder optical system occurs during that period.

In shifting the focal length position of the photographing optical system from a telephoto side to a middle position, the pin 5b of the first lever 5 pushes the rear end edge of the slot 7a of the second lever 7 to cause the second lever 7 to turn in such a way as to cause the image magnification of the viewfinder optical system to continuously vary, in the same manner as in shifting to the wide-angle position. After that, the pin 5b moves back toward a telephoto side as much as the amount of focus adjustment to reach a focus adjustment standby position of the middle position. As in the above-stated case, the light braking force applied to the second lever 7 by the pinching spring member 8 prevents the second lever 7 from following the forward motion of the first lever 5b when the moving direction of the pin 5b is reversed. After that, although a focusing action is performed in the same manner as in the above-stated case, the position of the viewfinder optical system remains unvaried.

A part (c) on the right side in FIG. 2 shows the movement of the pin 5b taking place in shifting the position of the photographing optical system to a telephoto (long focal length) position.

In shifting the position of the photographing optical system to the telephoto position, the photographing optical system is moved always from a wide-angle side. Therefore, in this case, the pin 5b of the first lever 5 moves forward while pushing the fore end edge of the slot 7a of the second lever 7 from the position shown in the drawing, so that the image magnifying rate of the viewfinder optical system continuously varies. When the photographing optical system comes to the telephoto position, the follower pin 2a of the first lens group holding tube 2 comes to the focus adjustment standby position 1d of the groove part 1b of the cam plate 1 and stops there. After that, at the time of performing a focusing action in the telephoto position, the pin 5b of the first lever 5 moves only within the internal range of the slot 7a of the second lever 7 as in the above-stated case, so that the second lever 7 does not move, and, therefore, the position of the viewfinder optical system remains stationary.

According to the arrangement of the first embodiment described above, the viewfinder optical system continuously performs an image magnification varying action when the photographing optical system is caused to perform its magnification varying action. When the photographing optical system is caused to perform the focusing (focus adjusting) action, however, the viewfinder optical system remains inoperative (stationary), so that the viewfinder can be prevented from giving any unpleasant, unnatural impression to the operator while focusing is in process.

While the embodiment has been described above as arranged to perform the focusing action by drawing the lens barrel inward, the focusing action of course may be arranged to be performed by drawing the lens barrel outward. In the case of such a modification, the directions of all actions described must be reversed.

Figure 3:
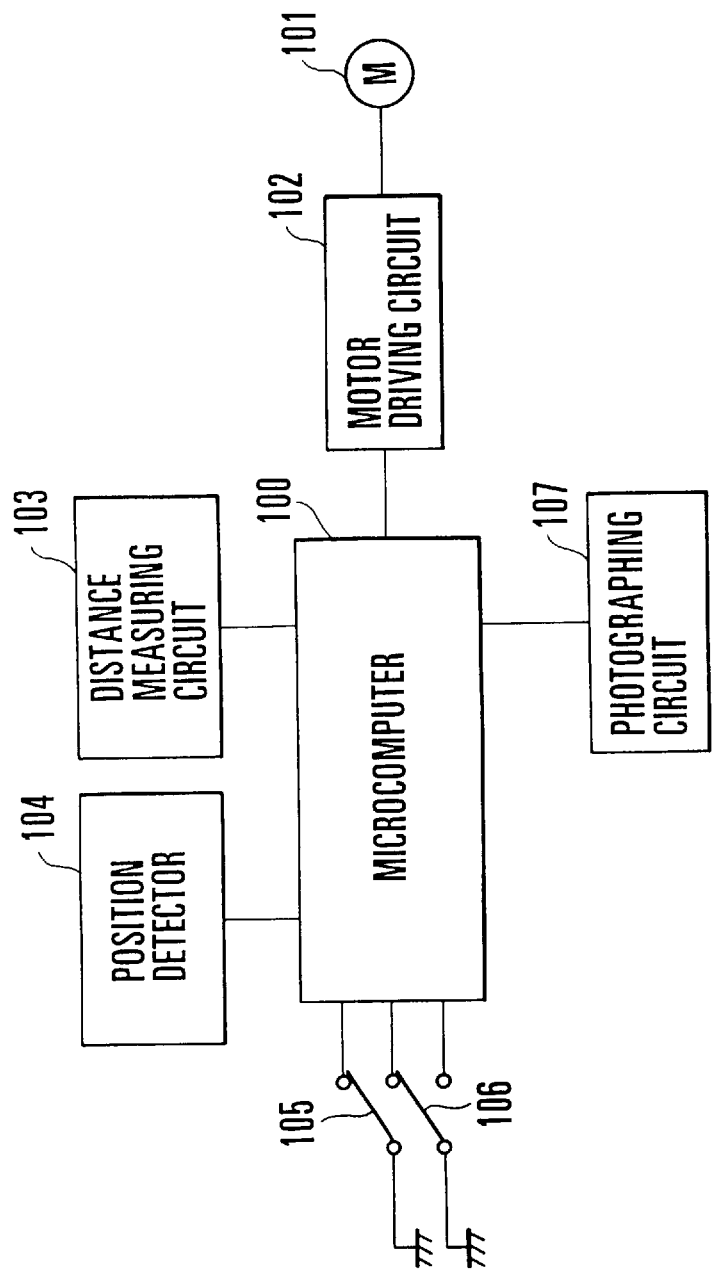
FIG. 3 is a schematic diagram showing in part an electrical control system of the optical system shown in FIG. 1.

FIG. 3 is a block diagram showing a part of the arrangement of a control system of the camera in the first embodiment of this invention.

Referring to FIG. 3, a microcomputer 100 is employed as a means for controlling the camera. A motor (M) 101 is arranged to drive the cam plate 1. A motor driving circuit 102 is arranged to drive the motor 101. A distance measuring circuit 103 is arranged in a known manner to include a distance measuring sensor, etc. A position detector 104 is arranged to detect the moving position of the cam plate 1. A known zoom switch 105 is provided on the camera. A release switch 106 is arranged in a known manner to turn on when a shutter release member is operated. A photographing circuit 107 is arranged in a known manner to include a light measuring sensor, a shutter, etc., for photographing.

Figure 4:
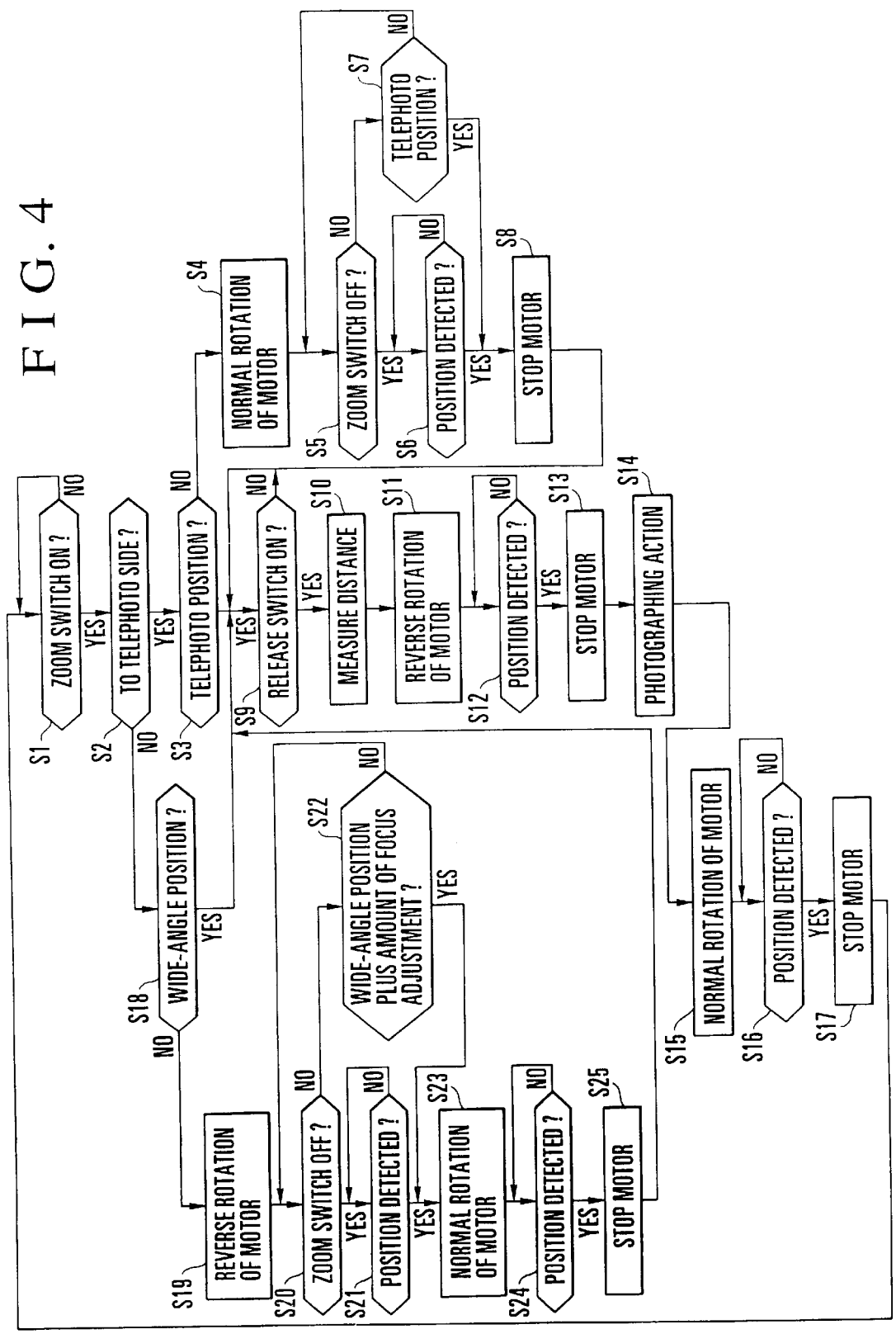
FIG. 4 is a flow chart showing an operation of a microcomputer 100 shown in FIG. 3.

FIG. 4 is a flow chart showing a control operation to be performed by the microcomputer 100. Functions and control actions of the camera are described below with reference to FIGS. 3 and 4.

At a step S1, a check is made to find if the zoom switch 105 is in an on-state. If so, the flow of operation proceeds to a step S2. If not, the step S1 is repeated.

At the step S2, a check is made to find if the zoom switch 105 is operated toward a telephoto side. If so, the flow of operation proceeds to a step S3. If not, i.e., if the zoom switch 105 is operated toward a wide-angle side, the flow proceeds to a step S18.

At the step S3, the position detector 104 is checked to find if the cam plate 1 is already located in the focus adjustment standby position 1d for the telephoto position. If so, the flow proceeds to a step S9. If not, the flow proceeds to a step S4.

At the step S4, the motor driving circuit 102 is caused to drive the motor 101 to make a normal rotation (to move the cam plate 1 in the direction of the arrow f). The normal rotation of the motor 101 causes the photographing optical system to be drawn outward.

At a step 5, a check is made to find if the zoom switch 105 has turned off. If so, the flow proceeds to a step S6. If not, the flow proceeds to a step S7.

At the step S6, the position detector 104 is checked to find if the follower pin 2a of the first lens group holding tube 2 has reached the focus adjustment standby position 1d in the cam groove part 1b of the cam plate 1. If so, the flow proceeds to a step S8.

At the step S7, a check is made through the position detector 104 to find if the cam plate 1 has reached the focus adjustment standby position 1d for the telephoto position. If so, the flow proceeds to the step S8. If not, the flow returns to the step S5.

At the step S8, the rotation of the motor 101 is brought to a stop. The flow proceeds to the step S9.

At the step S9, a check is made to find if the release switch 106 is in its on-state. If so, the flow proceeds to a step S10.

At the step S10, the distance measuring circuit 103 is caused to perform a distance measuring action.

At a step S11, the motor driving circuit 102 is caused to reversely rotate the motor 101. The reverse rotation of the motor 101 then causes the cam plate 1 to move in the direction of the arrow "g", i.e., in such a direction as to draw the photographing optical system inward.

At a step S12, the output of the position detector 104 is checked to find if the cam plate 1 has reached a position corresponding to the output of the distance measuring circuit 103. If so, the flow proceeds to a step S13.

At the step S13, the motor 101 is caused to stop rotating. The flow of operation then proceeds to a step S14.

At the step S14, the photographing circuit 107 is caused to perform a photographing action. Upon completion of the photographing action, the flow proceeds to a step S15.

At the step S15, the motor 101 is caused through the motor driving circuit 102 to move back the cam plate 1 in the direction of the arrow "f" by making a normal rotation.

At a step S16, a check is made through the position detector 104 to find if the cam plate 1 has reached a focus adjustment standby position 1d obtained before its movement caused at the step S11. The flow then proceeds to a step S17.

At the step S17, the motor 101 is caused to stop rotating, and the flow of operation returns to the step S1.

At the step S18, a check is made through the position detector 104 to find if the cam plate 1 is already located at the focus adjustment standby position 1d for the wide-angle position. If so, the flow proceeds to the step S9. If not, the flow proceeds to a step S19.

At the step S19, the motor 101 is caused through the motor driving circuit 102 to make a reverse rotation (to move the cam plate 1 in the direction of the arrow "g" as shown in FIG. 1). The reverse rotation of the motor 101 then moves the photographing optical system in such a direction to be drawn inward.

At a step S20, a check is made to find if the zoom switch 105 is in its off-state. If so, the flow proceeds to a step S21. If not, the flow of operation proceeds to a step S22.

At the step S21, the output of the position detector 104 is checked to find if the follower pin 2a of the first lens group holding tube 2 has moved to an extent corresponding to an amount of focus adjustment after its arrival at the focus adjustment standby position ld of the cam groove part 1b of the cam plate 1. If so, the flow of operation proceeds to a step S23.

At the step S22, a check is made through the position detector 104 to find if the cam plate 1 has moved to an extent corresponding to an amount of focus adjustment after its arrival at the focus adjustment standby position for the wide-angle position. If so, the flow proceeds to the step S23. If not, the flow returns to the step S20.

At the step S23, the cam plate 1 is caused to move in the direction of the arrow "f" (in such a direction as to draw the photographing optical system outward) by the normal rotation of the motor 101.

At a step S24, a check is made through the output of the position detector 104 to find if the follower pin 2a of the first lens group holding tube 2 has reached the focus adjustment standby position 1d of the cam groove part 1b of the cam plate 1. If so, the flow proceeds to a step S25.

At the step S25, the motor 101 is caused to stop rotating, and the flow proceeds to the step S9.

After that, the steps from the step S9 through the step S17 are executed in the same manner as described above.

According to the above operation, the pin 5b of the first lever 5 is caused to move as shown in FIG. 2.

Figure 5:
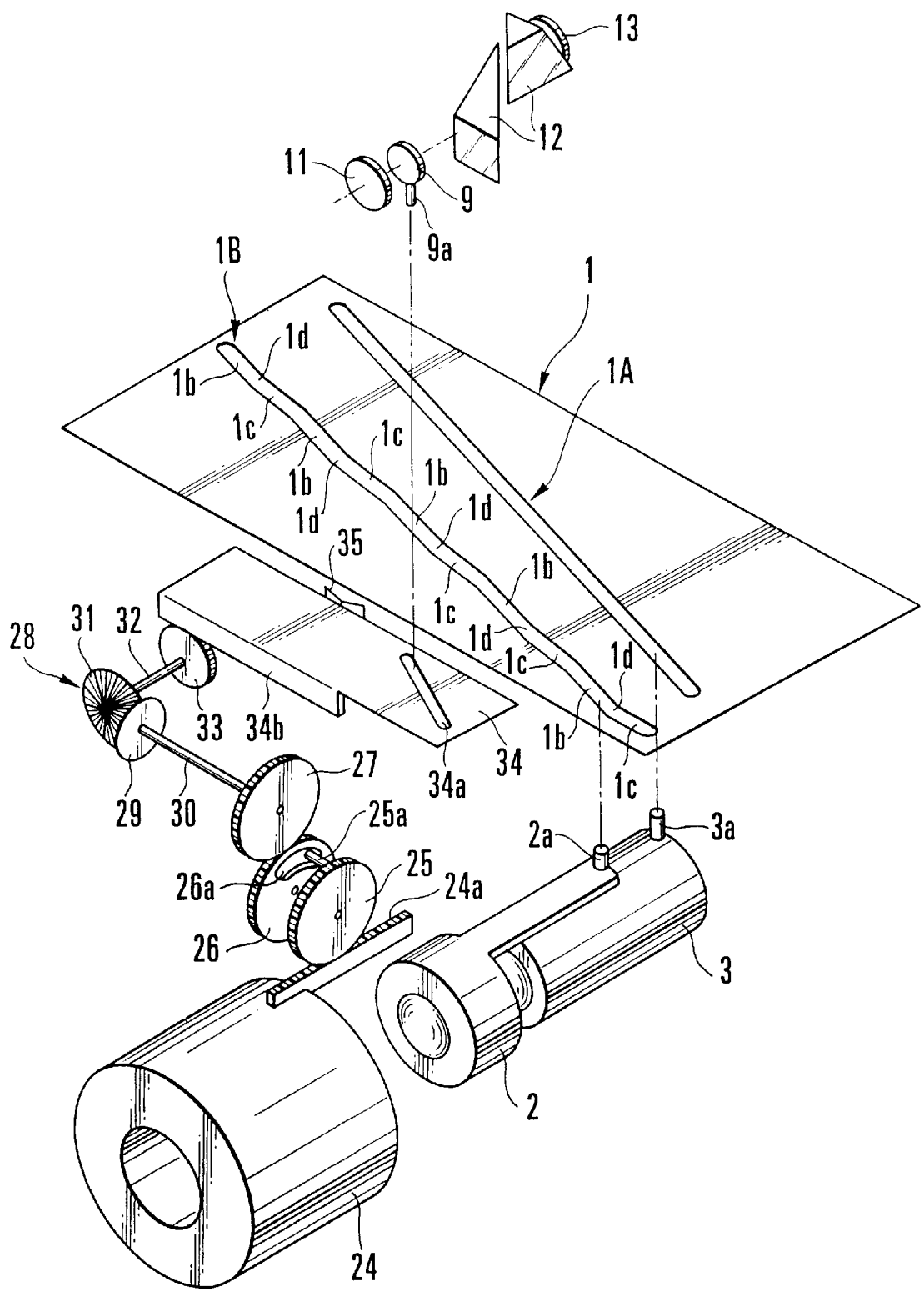
FIG. 5 is an exploded perspective view showing in part the mechanical structure of an optical apparatus arranged as a second embodiment of this invention.

FIG. 5 shows the arrangement of a second embodiment of this invention. The second embodiment differs from the first embodiment in that a gear mechanism is employed in place of the levers as an association means for associating the photographing optical system and the viewfinder optical system with each other. The following description of the second embodiment covers only the difference of the arrangement of the second embodiment from the arrangement of the first embodiment.

Referring to FIG. 5, a rack 24a which extends in parallel with the optical axis is fixed to a lens barrel 24 which moves integrally with the first lens group holding tube 2. A gear 25 which meshes with the rack 24a is supported by a structural member (not shown) of the camera in such a way as to be only rotatable in a fixed position. A pin 25a protrudes from a part near the peripheral edge of one side of the gear 25 in parallel with its shaft. The pin 25a is inserted into an arcuate slot 26a formed in another gear 26 which is arranged adjacent to and coaxially with the gear 25. The circumferential length of the slot 26a is arranged to be a predetermined length at which the axial movement of the photographing optical system is never transmitted to the viewfinder in the same manner as the length of the major side of the rectangular slot 7a of the second lever 7 in the first embodiment.

A gear 27 which is in mesh with the gear 26 is fixed to the same shaft 30 as a bevel gear 29 which is one of two bevel gears of a change-direction mechanism 28. The other bevel gear 31 is fixed to the same shaft 32 as a driving gear 33 which is arranged to drive a cam plate 34. The driving gear 33 is in mesh with a rack 34b which is formed on the cam plate 34. The cam plate 34 is arranged to move in a direction perpendicular to the optical axis according to the rotation of the driving gear 33. The cam plate 34 is provided with a cam groove 34a for controlling the position of a magnification varying lens holding frame 9 of the viewfinder. A follower pin 9a of the magnification varying lens holding frame 9 is inserted into the cam groove 34a in such a way as to be movable relative to the cam groove 34a. A friction member 35 which is in a leaf-spring like shape is arranged to be in pressed contact with the cam plate 34 in such a way as to let the cam plate 34 movable only when the cam plate 34 is driven by the driving gear 33.

In the second embodiment, the function of the association means for associating the photographing optical system and the viewfinder optical system with each other is the same as that of the first embodiment. More specifically, the rotation of the gear 25 is not transmitted to the gear 26 when the first lens group holding tube 2 and the second lens group holding tube 3 are moved for focusing along the cam groove 1A and the cam groove 1B. Further, when the first lens group holding tube 2 and the second lens group holding tube 3 are moved, for example, to a wide-angle position, the viewfinder optical system acts as described in the foregoing with reference to FIG. 2 in that case to continuously vary an image on display at the viewfinder.

Further, of course, an association means having functions defined by the combination of the pin 25a and the slot 26a may be discretely formed as an independent member.

As has been described above, according to the arrangement of the embodiments described above, there is provided an optical apparatus which gives no unnatural or unpleasant impression to the operator who looks into a viewfinder.

Further, according to the arrangement of the embodiments described above, when a focus adjusting action of an image forming optical system according to a distance to an object is performed, a viewfinder is not operated for varying magnification, and when a focus adjusting action of the image forming optical system in process of a magnification varying action thereof is performed, the viewfinder is operated for varying magnification, so that there is provided an optical apparatus which gives no unnatural or unpleasant impression to the operator who looks into the viewfinder.

Further, according to the arrangement of the embodiments described above, when a focus adjusting action of an image forming optical system according to a distance to an object is performed, a viewfinder is not operated for varying magnification, and when a focus adjusting action of the image forming optical system in process of a magnification varying action thereof is performed, the viewfinder is operated for continuously varying magnification according to the magnification varying action and the focus adjusting action of the image forming optical system, so that there is provided an optical apparatus which gives no unnatural or unpleasant impression to the operator who looks into the viewfinder.

Further, according to the arrangement of the embodiments described above, in an optical apparatus, having a magnification-varying guiding area and a focus-adjusting guiding area alternately provided, for causing an image forming optical unit to perform a magnification varying action and a focus adjusting action by guiding the image forming optical unit along the magnification-varying guiding area and the focus-adjusting guiding area, when the image forming optical unit is guided along the focus-adjusting guiding area to perform the focus adjusting action according to a distance to an object, a viewfinder is not operated for varying magnification, and when the image forming optical unit is guided along the focus-adjusting guiding area to perform the magnification varying action, the viewfinder is operated for varying magnification, so that the optical system gives no unnatural or unpleasant impression to the operator who looks into the viewfinder.

Further, according to the arrangement of the embodiments described above, the optical apparatus can be constructed in a simple manner at low cost.

The individual components shown in schematic or block form in the drawings are all well known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while, according to the embodiments described, the focus adjusting action is started always from the focus adjustment standby position, the arrangement may be changed to allow the focus adjusting action to begin at an intermediate position instead of the focus adjustment standby position. Further, this invention is not limited to the disclosed method of carrying out the magnification varying action and the focus adjusting action by means of the cam arrangement. This invention is of course applicable to any cases where these actions are arranged to be carried out by some suitable means other than the cam arrangement.

This invention applies to cases where either the whole or a part of the arrangement of each embodiment described forms one apparatus or is used in combination with some other apparatus or as a component element of an apparatus.

This invention is applicable to cameras of various kinds, such as a single-lens reflex camera, a lens-shutter type camera, a video camera, etc., optical apparatuses other than cameras, devices adapted to cameras, optical apparatuses and other apparatuses, and component elements forming these apparatuses and devices.

In each of the embodiments described, the action of the viewfinder to be performed in association with the movement of the photographing optical system is arranged to be a continuous magnification varying action. The invented arrangement, however, applies to viewfinder actions of various kinds, such as an action of varying the magnification in a stepwise manner (instead of varying the magnification continuously), an action of varying a field frame, etc.

Further, the software and hardware arrangements of the embodiments disclosed are interchangeable with each other as desired.

This invention may be carried out by combining as necessary the embodiments or their technological elements disclosed in the foregoing.

I claim:

1. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement, wherein said image forming optical system performs a focus adjusting action when said image forming optical system moves in such a state that the association of said viewfinder is severed.

2. An apparatus according to claim 1 wherein, said image forming optical system includes a device for performing a magnification varying action when said image forming optical system moves in such a state that the association of said viewfinder is made.

3. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement, wherein said image forming optical system performs a focus adjusting action and a magnification varying action when said image forming optical system moves in such a state that the association of said viewfinder is made.

4. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement, wherein said image forming optical system sequentially performs a first magnification varying action, a focus adjusting action and a second magnification varying action during a process where said image forming optical system moves in such a state that the association of said viewfinder is made.

5. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement; and a holding device which holds said viewfinder such that said viewfinder does not operate during a period when the association of said viewfinder with said image forming optical system is severed.

6. An apparatus according to claim 5, wherein said holding device includes a device which applies friction such that said viewfinder does not move.

7. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement; and a driving device which severs the association of said viewfinder and causes a focus adjusting action onto an object to be performed by, after moving said image forming optical system in a first direction while associating said viewfinder with the movement of image forming optical system, moving said image forming optical system in a second direction.

8. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement; and a driving device which severs the association of said viewfinder and causes a focus adjusting action onto an object to be performed by, after moving said image forming optical system in a first direction while associating said viewfinder with the movement of said image forming optical system, moving said image forming optical system in a second direction, and further, after a photographing action is ended, moves said image forming optical system to a predetermined position in the first direction in such a state that the association of said viewfinder is severed.

9. An optical apparatus comprising:

an association device which operates a viewfinder in association with a movement of an image forming optical system, said association device, after the movement of said image forming optical system, severing the associating of said viewfinder with respect to a movement of said image forming optical system in a direction different from that of the first-mentioned movement; and a driving device which severs the association of said viewfinder by, after moving said image forming optical system in a first direction while associating said viewfinder with the movement of said image forming optical system, moving said image forming optical system in a second direction, and causes a focus adjusting action onto an object to be performed by further moving said image forming optical system in the first direction in such a state that the association of said viewfinder is severed.

10. An optical apparatus comprising:

an association device which operates a viewfinder in association with a movement of an image forming optical system, said association device, after the movement of said image forming optical system, severing the association of said viewfinder with respect to a movement of said image forming optical system in a direction different from that of the first-mentioned movement; and a driving device which severs the association of said viewfinder by, after moving said image forming optical system in a first direction while associating said viewfinder with the movement of said image forming optical system, moving said image forming optical system in a second direction, causes a focus adjusting action onto an object to be performed by further moving said image forming optical system in the first direction in such a state that the association of said viewfinder is severed, and further, after a photographing action is ended, moves said image forming optical system to a predetermined position in the second direction in such a state that the association of said viewfinder is severed.

11. An optical apparatus comprising:
 (A) an optical-unit guiding device which has a focus-adjusting guiding area and a magnification-varying guiding area alternately served and which causes an image forming optical unit to perform a focus adjusting action and a magnification varying action by guiding said image forming optical unit along the focus-adjusting guiding area and the magnification-varying guiding area; and
 (B) an association device which operates a viewfinder in association with said image forming optical unit being guided in one direction along the magnification-varying guiding area and the focus-adjusting guiding area of said optical-unit guiding device, said association device severing the association of said viewfinder with respect to said image forming optical unit, after being guided in said one direction along the magnification-varying guiding area and the focus-adjusting guiding area of said optical-unit guiding device, being further guided in a direction different from said one direction along the focus-adjusting guiding area of said optical-unit guiding device.

12. An apparatus according to claim 11, wherein said association device operates said viewfinder continuously in association with said image forming optical unit being guided in said one direction along the magnification-varying area and the focus-adjusting area.

13. An apparatus according to claim 11, wherein said association device causes said viewfinder to perform a magnification varying action in association with said image forming optical unit being guided in said one direction along the magnification-varying guiding area and the focus-adjusting area.

14. An apparatus according to claim 11, wherein said association device causes said viewfinder to perform a magnification varying action continuously in association with said image forming optical unit being guided in said one direction along the magnification-varying guiding area and the focus-adjusting guiding area.

15. An apparatus according to claim 11, wherein said association device includes an inoperating device which causes said viewfinder not to perform a magnification varying action with respect to said image forming optical unit, after being guided in said one direction along the magnification-varying guiding area and the focus-adjusting guiding area of said optical-unit guiding device, being further guided in said direction different from said one direction along the focus adjusting guiding area of said optical-unit guiding device.

16. An apparatus according to claim 15, wherein said inoperating device includes a holding device which holds said viewfinder such that said viewfinder does not operate.

17. An apparatus according to claim 16, wherein said holding device includes a device which applies friction such that said viewfinder does not move.

18. An apparatus according to claim 11, further comprising a control device which performs a focus adjusting action onto an object when said image forming optical unit, after being guided in said one direction along the magnification-varying guiding area and the focus-adjusting guiding area of said optical-unit guiding device, is further guided in said direction different from said one direction along the focus-adjusting guiding area of said optical-unit guiding device.

19. An apparatus according to claim 11, further comprising a control device which performs a desired magnification varying action when said image forming optical unit is guided in said one direction along the focus-adjusting guiding area and the magnification-varying guiding area of said optical-unit guiding device.

20. An apparatus according to claim 11, wherein said association device includes a space forming portion for severing the association of said viewfinder.

21. An apparatus according to claim 11, wherein said association device, after operating said viewfinder in association with said image forming optical unit being guided in said one direction along the magnification-varying guided area and the focus-adjusting guiding area of said optical-unit guiding device, severs the association of said viewfinder with respect to said image forming optical unit being guided a predetermined distance in a direction different from said one direction along the focus-adjusting guiding area of said optical-unit guiding device, and which, after that, associates said viewfinder with the movement of said image forming optical unit in accordance with said image forming optical unit being further guided a predetermined distance in the direction different from said one direction along the focus-adjusting guiding area of said optical-unit guiding device.

22. An apparatus according to claim 11, further comprising a driving device which, after driving said image forming optical unit in said direction along the magnification-varying guiding area and the focus-adjusting guiding area of said optical-unit guiding device, further drives said image forming optical unit in said direction different from said one direction along the focus-adjusting guiding area of said optical-unit guiding device.

23. An apparatus according to claim 22, wherein said driving device includes an electric motor.

24. An apparatus according to claim 22, further comprising a position determining device which determines a guided position of said image forming optical unit by said optical-unit guiding device, and wherein said driving device includes a control device which controls the driving of said image forming optical unit in accordance with a determination result provided by said position determining device.

25. An apparatus according to claim 11, further comprising a driving device which, after driving said image forming optical unit in said direction along the magnification-varying guiding area and the focus-adjusting guiding area of said optical-unit guiding device, further drives said image forming optical unit in said direction different from said one direction along the focus-adjusting guiding area of said optical-unit guiding device so as to sever the association of said viewfinder with said image forming optical unit, and drives said image forming optical unit in said one direction along the focus-adjusting guiding area of said optical-unit guiding device in such a state that the association of said viewfinder is severed.

26. An apparatus according to claim 11, further comprising a driving device which performs a focus adjusting action onto an object by, after driving said image forming optical unit in said one direction along the magnification-varying guiding area and the focus-adjusting guiding area of said optical-unit guiding device, further driving said image forming optical unit in said direction different from said one direction along the focus-adjusting guiding area of said optical-unit guiding device.

27. An apparatus according to claim 11, further comprising a driving device which performs a focus adjusting action onto an object by, after driving said image forming optical unit in said one direction along the magnification-varying guiding area and the focus-adjusting guiding area of said optical-unit guiding device, further driving said image forming optical unit in said direction different from said one direction along the focus-adjusting guiding area of said optical-unit guiding device, and further, after a photographing action is ended, drives said image forming optical unit to a predetermined position in said one direction along the focus-adjusting guiding area of said optical-unit guiding device in such a state that the association of said viewfinder is severed.

28. An apparatus according to claim 11, further comprising a driving device which drives said image forming optical unit in said one direction along the magnification-varying guiding area and the focus-adjusting guiding area of said optical-unit guiding device, and further drives said image forming optical unit in said direction different from said one direction along the focus-adjusting guiding area of said optical-unit guiding device, and which further performs a focus adjusting action onto an object by driving said image forming optical unit in said one direction along the focus-adjusting guiding area of said optical-unit guiding device in such a state that the association of said viewfinder is severed.

29. An apparatus according to claim 11, further comprising a driving device which drives said image forming optical unit in said one direction along the magnification-varying guiding area and the focus-adjusting guiding area of said optical-unit guiding device, and further drives said image forming optical unit in said direction different from said one direction along the focus-adjusting guiding area of said optical-unit guiding device, which performs a focus adjusting action onto an object by driving said image forming optical unit in said one direction along the focus-adjusting guiding area of said optical-unit guiding device in such a state that the association of said viewfinder is severed, and which further, after a photographing action is ended, drives said image forming optical unit to a predetermined position in the direction different from said one direction along the focus-adjusting guiding area of said optical-unit guiding device in such a state that the association of said viewfinder is severed.

30. An apparatus according to claim 11, wherein said optical apparatus includes a camera.

31. An apparatus according to claim 11, wherein said image forming optical unit includes a photographic lens.

32. An optical apparatus comprising:
(A) an image forming optical unit;
(B) a viewfinder;
(C) an optical unit-guiding device which has a focus-adjusting guiding area and a magnification-varying guiding area alternately served and which causes said image forming optical unit to perform a focus adjusting action and a magnification varying action by guiding said image forming optical unit along the focus-adjusting guiding area and the magnification-varying guiding area; and
(D) an association device which operates said viewfinder in association with said image forming optical unit being guided in one direction along the magnification-varying guiding area and the focus-adjusting guiding area of said optical unit guiding-device, said association device severing the association of said viewfinder with respect to said image forming optical unit, after being guided in said one direction along the magnification-varying guiding area and the focus-adjusting guiding area of said optical unit-guiding device, being further guided in a direction different from said one direction along the focus-adjusting guiding area of said optical unit-guiding device.

33. An apparatus according to claim 1, wherein said optical apparatus includes a camera.

34. An apparatus according to claim 1, wherein said image forming optical apparatus includes a photographing optical system.

35. An apparatus according to claim 1, wherein said association device includes a space forming portion for severing the association of said viewfinder.

36. An apparatus according to claim 1, wherein said viewfinder includes a device for changing a magnification when said viewfinder is operated in association with the movement of said image forming optical system.

37. An apparatus according to claim 1, wherein said viewfinder includes a device for changing a magnification continuously when said viewfinder is operated in association with the movement of said image forming optical system.

38. An apparatus according to claim 1, wherein said association device includes a device which associates said viewfinder with the movement of said image forming optical system in accordance with said image forming optical system, after moving a predetermined distance in such a direction to sever the association of said viewfinder, further moving in the same direction.

39. An apparatus according to claim 1, further comprising a driving device which severs the association of said viewfinder by, after moving said image forming optical system in a first direction while associating said viewfinder with the movement of said image forming optical system, moving said image forming optical system in a second direction.

40. An apparatus according to claim 39, wherein said driving device includes an electric motor.

41. An apparatus according to claim 39, further comprising a position determining device which determines a moving position of said image forming optical system, and wherein said driving device includes a control device which controls the movement of said image forming optical system in accordance with a determination result provided by said position determining device.

42. An apparatus according to claim 1, further comprising a driving device which severs the association of said viewfinder by, after moving said image forming optical system in a first direction while associating said viewfinder with the movement of said image forming optical system, moving said image forming optical system in a second direction, and further moves said image forming optical system in the first direction in such a state that the association of said viewfinder is severed.

43. An apparatus according to claim 3, wherein said optical apparatus includes a camera.

44. An apparatus according to claim 3, wherein said image forming optical apparatus includes a photographing optical system.

45. An apparatus according to claim 3, wherein said association device includes a space forming portion for severing the association of said viewfinder.

46. An apparatus according to claim 3, wherein said viewfinder includes a device for changing a magnification when said viewfinder is operated in association with the movement of said image forming optical system.

47. An apparatus according to claim 3, wherein said viewfinder includes a device for changing a magnification continuously when said viewfinder is operated in association with the movement of said image forming optical system.

48. An apparatus according to claim 3, wherein said association device includes a device which associates said viewfinder with the movement of said image forming optical system in accordance with said image forming optical system, after moving a predetermined distance in such a direction to sever the association of said viewfinder, further moving in the same direction.

49. An apparatus according to claim 3, further comprising a driving device which severs the association of said viewfinder by, after moving said image forming optical system in a first direction while associating said viewfinder with the movement of said image forming optical system, moving said image forming optical system in a second direction.

50. An apparatus according to claim 49, wherein said driving device includes an electric motor.

51. An apparatus according to claim 49, further comprising a position determining device which determines a moving position of said image forming optical system, and wherein said driving device includes a control device which controls the movement of said image forming optical system in accordance with a determination result provided by said position determining device.

52. An apparatus according to claim 3, further comprising a driving device which severs the association of said viewfinder by, after moving said image forming optical system in a first direction while associating said viewfinder with the movement of said image forming optical system, moving said image forming optical system in a second direction, and further moves said image forming optical system in the first direction in such a state that the association of said viewfinder is severed.

53. An apparatus according to claim 4, wherein said optical apparatus includes a camera.

54. An apparatus according to claim 4, wherein said image forming optical apparatus includes a photographing optical system.

55. An apparatus according to claim 4, wherein said association device includes a space forming portion for severing the association of said viewfinder.

56. An apparatus according to claim 4, wherein said viewfinder includes a device for changing a magnification when said viewfinder is operated in association with the movement of said image forming optical system.

57. An apparatus according to claim 4, wherein said viewfinder includes a device for changing a magnification continuously when said viewfinder is operated in association with the movement of said image forming optical system.

58. An apparatus according to claim 4, wherein said association device includes a device which associates said viewfinder with the movement of said image forming optical system in accordance with said image forming optical system, after moving a predetermined distance in such a direction to sever the association of said viewfinder, further moving in the same direction.

59. An apparatus according to claim 4, further comprising a driving device which severs the association of said viewfinder by, after moving said image forming optical system in a first direction while associating said viewfinder with the movement of said image forming optical system, moving said image forming optical system in a second direction.

60. An apparatus according to claim 59, wherein said driving device includes an electric motor.

61. An apparatus according to claim 59, further comprising a position determining device which determines a moving position of said image forming optical system, and wherein said driving device includes a control device which controls the movement of said image forming optical system in accordance with a determination result provided by said position determining device.

62. An apparatus according to claim 4, further comprising a driving device which severs the association of said viewfinder by, after moving said image forming optical system in a first direction while associating said viewfinder with the movement of said image forming optical system, moving said image forming optical system in a second direction, and further moves said image forming optical system in the first direction in such a state that the association of said viewfinder is severed.

63. An apparatus according to claim 5, wherein said optical apparatus includes a camera.

64. An apparatus according to claim 5, wherein said image forming optical apparatus includes a photographing optical system.

65. An apparatus according to claim 5, wherein said association device includes a space forming portion for severing the association of said viewfinder.

66. An apparatus according to claim 5, wherein said viewfinder includes a device for changing a magnification when said viewfinder is operated in association with the movement of said image forming optical system.

67. An apparatus according to claim 5, wherein said viewfinder includes a device for changing a magnification continuously when said viewfinder is operated in association with the movement of said image forming optical system.

68. An apparatus according to claim 5, wherein said association device includes a device which associates said viewfinder with the movement of said image forming optical system in accordance with said image forming optical system, after moving a predetermined distance in such a direction to sever the association of said viewfinder, further moving in the same direction.

69. An apparatus according to claim 5, further comprising a driving device which severs the association of said viewfinder by, after moving said image forming optical system in a first direction while associating said viewfinder with the movement of said image forming optical system, moving said image forming optical system in a second direction.

70. An apparatus according to claim 69, wherein said driving device includes an electric motor.

71. An apparatus according to claim 69, further comprising a position determining device which determines a moving position of said image forming optical system, and wherein said driving device includes a control device which controls the movement of said image forming optical system in accordance with a determination result provided by said position determining device.

72. An apparatus according to claim 5, further comprising a driving device which severs the association of said viewfinder by, after moving said image forming optical system in a first direction while associating said viewfinder with the movement of said image forming optical system, moving said image forming optical system in a second direction, and further moves said image forming optical system in the first direction in such a state that the association of said viewfinder is severed.

73. An apparatus according to claim 7, wherein said optical apparatus includes a camera.

74. An apparatus according to claim 7, wherein said image forming optical apparatus includes a photographing optical system.

75. An apparatus according to claim 7, wherein said association device includes a space forming portion for severing the association of said viewfinder.

76. An apparatus according to claim 7, wherein said viewfinder includes a device for changing a magnification when said viewfinder is operated in association with the movement of said image forming optical system.

77. An apparatus according to claim 7, wherein said viewfinder includes a device for changing a magnification continuously when said viewfinder is operated in association with the movement of said image forming optical system.

78. An apparatus according to claim 18, wherein said driving device includes an electric motor.

79. An apparatus according to claim 18, further comprising a position determining device which determines a moving position of said image forming optical system, and wherein said driving device includes a control device which controls the movement of said image forming optical system in accordance with a determination result provided by said position determining device.

80. An apparatus according to claim 8, wherein said optical apparatus includes a camera.

81. An apparatus according to claim 8, wherein said image forming optical apparatus includes a photographing optical system.

82. An apparatus according to claim 8, wherein said association device includes a space forming portion for severing the association of said viewfinder.

83. An apparatus according to claim 8, wherein said viewfinder includes a device for changing a magnification when said viewfinder is operated in association with the movement of said image forming optical system.

84. An apparatus according to claim 8, wherein said viewfinder includes a device for changing a magnification continuously when said viewfinder is operated in association with the movement of said image forming optical system.

85. An apparatus according to claim 19, wherein said driving device includes an electric motor.

86. An apparatus according to claim 19, further comprising a position determining device which determines a moving position of said image forming optical system, and wherein said driving device includes a control device which controls the movement of said image forming optical system in accordance with a determination result provided by said position determining device.

87. An apparatus according to claim 9, wherein said optical apparatus includes a camera.

88. An apparatus according to claim 9, wherein said image forming optical apparatus includes a photographing optical system.

89. An apparatus according to claim 9, wherein said association device includes a space forming portion for severing the association of said viewfinder.

90. An apparatus according to claim 9, wherein said viewfinder includes a device for changing a magnification when said viewfinder is operated in association with the movement of said image forming optical system.

91. An apparatus according to claim 9, wherein said viewfinder includes a device for changing a magnification continuously when said viewfinder is operated in association with the movement of said image forming optical system.

92. An apparatus according to claim 20, wherein said driving device includes an electric motor.

93. An apparatus according to claim 10, wherein said optical apparatus includes a camera.

94. An apparatus according to claim 10, wherein said image forming optical apparatus includes a photographing optical system.

95. An apparatus according to claim 10, wherein said association device includes a space forming portion for severing the association of said viewfinder.

96. An apparatus according to claim 10, wherein said viewfinder includes a device for changing a magnification when said viewfinder is operated in association with the movement of said image forming optical system.

97. An apparatus according to claim 10, wherein said viewfinder includes a device for changing a magnification continuously when said viewfinder is operated in association with the movement of said image forming optical system.

98. An apparatus according to claim 21, wherein said driving device includes an electric motor.

99. An apparatus according to claim 21, further comprising a position determining device which determines a moving position of said image forming optical system, and wherein said driving device includes a control device which controls the movement of said image forming optical system in accordance with a determination result provided by said position determining device.

100. An optical apparatus comprising:

an image forming optical system;

a viewfinder; and an association device which operates said viewfinder in association with a movement of said image forming optical system, said association device, after the movement of said image forming optical system, severing the association of said viewfinder with respect to a movement of said image forming optical system in a direction different from that of the first-mentioned movement, wherein said image forming optical system performs a focus adjusting action when said image forming optical system moves in such a state that the association of said viewfinder is severed.

101. An optical apparatus comprising:

an image forming optical system;

a viewfinder; and an association device which operates said viewfinder in association with a movement of said image forming optical system, said association device, after the movement of said image forming optical system, severing the association of said viewfinder with respect to a movement of said image forming optical system in a direction different from that of the first-mentioned movement, wherein said image forming optical system performs a focus adjusting action and a magnification varying action when said image forming optical system moves in such a state that the association of said viewfinder is made.

102. An optical apparatus comprising:

an image forming optical system;

a viewfinder; and an association device which operates said viewfinder in association with a movement of said image forming optical system, said association device, after the movement of said image forming optical system, severing the association of said viewfinder with respect to a movement of said image forming optical system in a direction different from that of the first-mentioned movement, wherein said image forming optical system sequentially performs a first magnification varying action, a focus adjusting action and a second magnification varying action during a process where said image forming optical system moves in such a state that the association of said viewfinder is made.

103. An optical apparatus comprising:
an image forming optical system;
a viewfinder; and
an association device which operates said viewfinder in association with a movement of said image forming optical system, said association device, after the movement of said image forming optical system, severing the association of said viewfinder with respect to a movement of said image forming optical system in a direction different from that of the first-mentioned movement; and
a holding device which holds said viewfinder such that said viewfinder does not operate during a period when the association of said viewfinder with said image forming optical system is severed.

104. An apparatus according to claim 100, wherein said optical apparatus includes a camera.

105. An apparatus according to claim 100, wherein said image forming optical apparatus includes a photographing optical system.

106. An apparatus according to claim 100, wherein said association device includes a space forming portion for severing the association of said viewfinder.

107. An apparatus according to claim 100, wherein said viewfinder includes a device for changing a magnification when said viewfinder is operated in association with the movement of said image forming optical system.

108. An apparatus according to claim 100, wherein said viewfinder includes a device for changing a magnification continuously when said viewfinder is operated in association with the movement of said image forming optical system.

109. An apparatus according to claim 101, wherein said optical apparatus includes a camera.

110. An apparatus according to claim 101, wherein said image forming optical apparatus includes a photographing optical system.

111. An apparatus according to claim 101, wherein said association device includes a space forming portion for severing the association of said viewfinder.

112. An apparatus according to claim 101, wherein said viewfinder includes a device for changing a magnification when said viewfinder is operated in association with the movement of said image forming optical system.

113. An apparatus according to claim 101, wherein said viewfinder includes a device for changing a magnification continuously when said viewfinder is operated in association with the movement of said image forming optical system.

114. An apparatus according to claim 102, wherein said optical apparatus includes a camera.

115. An apparatus according to claim 102, wherein said image forming optical apparatus includes a photographing optical system.

116. An apparatus according to claim 102, wherein said association device includes a space forming portion for severing the association of said viewfinder.

117. An apparatus according to claim 102, wherein said viewfinder includes a device for changing a magnification when said viewfinder is operated in association with the movement of said image forming optical system.

118. An apparatus according to claim 102, wherein said viewfinder includes a device for changing a magnification continuously when said viewfinder is operated in association with the movement of said image forming optical system.

119. An apparatus according to claim 103, wherein said optical apparatus includes a camera.

120. An apparatus according to claim 103, wherein said image forming optical apparatus includes a photographing optical system.

121. An apparatus according to claim 103, wherein said association device includes a space forming portion for severing the association of said viewfinder.

122. An apparatus according to claim 103, wherein said viewfinder includes a device for changing a magnification when said viewfinder is operated in association with the movement of said image forming optical system.

123. An apparatus according to claim 103, wherein said viewfinder includes a device for changing a magnification continuously when said viewfinder is operated in association with the movement of said image forming optical system.

124. An apparatus according to claim 32, wherein said association device operates said viewfinder continuously in association with said image forming optical unit being guided in one direction along the magnification-varying area and the focus-adjusting area.

125. An apparatus according to claim 32, wherein said association device causes said viewfinder to perform a magnification varying action in association with said image forming optical unit being guided in said one direction along the magnification-varying guiding area and the focus-adjusting area.

126. An apparatus according to claim 32, wherein said association device causes said viewfinder to perform a magnification varying action continuously in association with said image forming optical unit being guided in said one direction along the magnification-varying guiding area and the focus-adjusting guiding area.

127. An apparatus according to claim 32, wherein said association device includes an inoperating device which causes said viewfinder not to perform a magnification varying action with respect to said image forming optical unit, after being guided in said one direction along the magnification-varying guiding area and the focus adjusting guiding area of said optical-unit guiding device, being further guided in said direction different from said one direction along the focus adjusting guiding area of said optical-unit guiding device.

128. An apparatus according to claim 127, wherein said inoperating device includes a holding device which holds said viewfinder such that said viewfinder does not operate.

129. An apparatus according to claim 128, wherein said holding device includes a device which applies friction such that said viewfinder does not move.

130. An apparatus according to claim 32, further comprising a control device which performs a focus adjusting action onto an object when said image forming optical unit, after being guided in said one direction along the magnification-varying guiding area and the focus-adjusting guiding area of said optical-unit guiding device, is further guided in said direction different from said one direction along the focus adjusting guiding area of said optical-unit guiding device.

131. An apparatus according to claim 32, further comprising a control device which performs a desired magnification varying action when said image forming optical unit is guided in said one direction along the focus-adjusting guiding area and the magnification-varying guiding area of said optical unit guiding device.

132. An apparatus according to claim 32, wherein said association device includes a space forming portion for severing the association of said viewfinder.

133. An apparatus according to claim 32, wherein said association device, after operating said viewfinder in association with said image forming optical unit being guided in said one direction along the magnification-varying guided area and the focus-adjusting guiding area of said optical-unit guiding device, severs the association of said viewfinder with respect to said image forming optical unit being guided a predetermined distance in said direction different from said one direction along the focus-adjusting guiding area of said optical-unit guiding device, and which, after that, associates said viewfinder with the movement of said image forming optical unit in accordance with said image forming optical unit being further guided a predetermined distance in the direction different from said one direction along the focus-adjusting guiding area of said optical-unit guiding device.

134. An apparatus according to claim 32, wherein said association device includes a device which, after operating said viewfinder in association with said image forming optical unit being guided in said one direction along the magnification-varying guided area and the focus-adjusting guiding area of said optical-unit guiding means, severs the association of said viewfinder with respect to said image forming optical unit being guided a predetermined distance in said direction different from said one direction along the focus-adjusting guiding area of said optical-unit guiding device, and which, after that, associates said viewfinder with the movement of said image forming optical unit in accordance with said image forming optical unit being further guided a predetermined distance in the direction different from said one direction along the focus-adjusting guiding area of said optical-unit guiding device.

135. An apparatus according to claim 32, further comprising a driving device which, after driving said image forming optical unit in said one direction along the magnification varying guiding area and the focus-adjusting guiding area of said optical-unit guiding device, further drives said image forming optical unit in said direction different from said one direction along the focus-adjusting guiding area of said optical-unit guiding device.

136. An apparatus according to claim 135, wherein said driving device includes an electric motor.

137. An apparatus according to claim 136, further comprising a position determining device which determines a guided position of said image forming optical unit by said optical-unit guiding device, and wherein said driving device includes a control device which controls the driving of said image forming optical unit in accordance with a determination result provided by said position determining device.

138. An apparatus according to claim 43, wherein said optical apparatus includes a camera.

139. An apparatus according to claim 43, wherein said image forming optical unit includes a photographic lens.

140. An apparatus according to claim 43, wherein said image forming optical unit includes a photographic optical unit.

141. An optical apparatus comprising:
an image forming optical system;
a viewfinder; and
an association device which operates said viewfinder in association with a movement of said image forming optical system, said association device, after the movement of said image forming optical system, severing the association of said viewfinder with respect to a movement of said image forming optical system in a direction different from that of the first-mentioned movement; and
a driving device which severs the association of said viewfinder and causes a focus adjusting action onto an object to be performed by, after moving said image forming optical system in a first direction while associating said viewfinder with the movement of said image forming optical system, moving said image forming optical system in a second direction.

142. An optical apparatus comprising:
an image forming optical system;
a viewfinder; and
an association device which operates said viewfinder in association with a movement of said image forming optical system, said association device, after the movement of said image forming optical system, severing the association of said viewfinder with respect to a movement of said image forming optical system in a direction different from that of the first-mentioned movement; and
a driving device which severs the association of said viewfinder and causes a focus adjusting action onto an object to be performed by, after moving said image forming optical system in a first direction while associating said viewfinder with the movement of said image forming optical system, moving said image forming optical system in a second direction, and further, after a photographing action is ended, moves said image forming optical system to a predetermined position in the first direction in such a state that the association of said viewfinder is severed.

143. An optical apparatus comprising:
an image forming optical system;
a viewfinder; and
an association device which operates said viewfinder in association with a movement of said image forming optical system, said association device, after the movement of said image forming optical system, severing the associating of said viewfinder with respect to a movement of said image forming optical system in a direction different from that of the first-mentioned movement; and
a driving device which severs the association of said viewfinder by, after moving said image forming optical system in a first direction while associating said viewfinder with the movement of said image forming optical system, moving said image forming optical system in a second direction, and causes a focus adjusting action onto an object to be performed by further moving said image forming optical system in the first direction in such a state that the association of said viewfinder is severed.

144. An optical apparatus comprising:
an image forming optical system;
a viewfinder; and
an association device which operates said viewfinder in association with a movement of said image forming optical system, said association device, after the movement of said image forming optical system, severing the association of said viewfinder with respect to a movement of said image forming optical system in a direction different from that of the first-mentioned movement; and
a driving device which severs the association of said viewfinder by, after moving said image forming optical system in a first direction while associating said viewfinder with the movement of said image forming optical system, moving said image forming optical system in a second direction, causes a focus adjusting action onto an object to be performed by further moving said image forming optical system in the first direction in such a state that the association of said viewfinder is severed, and further, after a photographing action is ended, moves said image forming optical system to a predetermined position in the second direction in such a state that the association of said viewfinder is severed.

145. An apparatus according to claim 141, wherein said optical apparatus includes a camera.

146. An apparatus according to claim 141, wherein said image forming optical apparatus includes a photographing optical system.

147. An apparatus according to claim 141, wherein said association device includes a space forming portion for severing the association of said viewfinder.

148. An apparatus according to claim 141, wherein said viewfinder includes a device for changing a magnification when said viewfinder is operated in association with the movement of said image forming optical system.

149. An apparatus according to claim 141, wherein said viewfinder includes a device for changing a magnification continuously when said viewfinder is operated in association with the movement of said image forming optical system.

150. An apparatus according to claim 142, wherein said optical apparatus includes a camera.

151. An apparatus according to claim 142, wherein said image forming optical apparatus includes a photographing optical system.

152. An apparatus according to claim 142, wherein said association device includes a space forming portion for severing the association of said viewfinder.

153. An apparatus according to claim 142, wherein said viewfinder includes a device for changing a magnification when said viewfinder is operated in association with the movement of said image forming optical system.

154. An apparatus according to claim 142, wherein said viewfinder includes a device for changing a magnification continuously when said viewfinder is operated in association with the movement of said image forming optical system.

155. An apparatus according to claim 143, wherein said optical apparatus includes a camera.

156. An apparatus according to claim 143, wherein said image forming optical apparatus includes a photographing optical system.

157. An apparatus according to claim 143, wherein said association device includes a space forming portion for severing the association of said viewfinder.

158. An apparatus according to claim 143, wherein said viewfinder includes a device for changing a magnification when said viewfinder is operated in association with the movement of said image forming optical system.

159. An apparatus according to claim 143, wherein said viewfinder includes a device for changing a magnification continuously when said viewfinder is operated in association with the movement of said image forming optical system.

160. An apparatus according to claim 144, wherein said optical apparatus includes a camera.

161. An apparatus according to claim 144, wherein said image forming optical apparatus includes a photographing optical system.

162. An apparatus according to claim 144, wherein said association device includes a space forming portion for severing the association of said viewfinder.

163. An apparatus according to claim 144, wherein said viewfinder includes a device for changing a magnification when said viewfinder is operated in association with the movement of said image forming optical system.

164. An apparatus according to claim 144, wherein said viewfinder includes a device for changing a magnification continuously when said viewfinder is operated in association with the movement of said image forming optical system.

165. An apparatus according to claim 20, further comprising a position determining device which determines a moving position of said image forming optical system, and wherein said driving device includes a control device which controls the movement of said image forming optical system in accordance with a determination result provided by said position determining device.

* * * * *

UNITED STATES PATENT AND TRADEMARK OFFICE
CERTIFICATE OF CORRECTION

PATENT NO. : 5,864,719
DATED : Jan. 26, 1999
INVENTOR(S) : Michio Hirohata

It is certified that error appears in the above-identified patent and that said Letters Patent is hereby corrected as shown below:

Col. 5, line 13, delete "as much as" and insert -- equal to --.
Col. 5, line 34, delete "id" and insert -- 1d --.
Claim 22, line 3, after "said" insert -- one --
Claim 25, line 3, after "said" insert -- one --.
Claim 78, line 1, delete "claim 18" and insert -- claim 7--.
Claim 79, line 1, delete "claim 18" and insert --claim 7 --.
Claim 85, line 1, delete "claim 19" and insert -- claim 8 --.
Claim 86, line 1, delete "claim 19" and insert -- claim 8 --.
Claim 92, line 1, delete "claim 20" and insert -- claim 9 --.
Claim 98, line 1, delete "claim 21" and insert -- claim 10 --.
Claim 99, line 1, delete "claim 21" and insert -- claim 10 --.
Claim 138, line 1, delete "claim 43" and insert -- claim 32 --.
Claim 139, line 1, delete "claim 43" and insert -- claim 32 --.
Claim 140, line 1, delete "claim 43" and insert -- claim 32 --.
Claim 165, line 1, delete "claim 20" and insert -- claim 9 --.

Signed and Sealed this

Ninth Day of November, 1999

Attest:

Q. TODD DICKINSON

*Attesting Officer*   *Acting Commissioner of Patents and Trademarks*